April 22, 1969  R. W. KLEKAMP  3,439,440
EXTENSIBLE LICENSE PLATE HOLDER
Filed Sept. 26, 1966
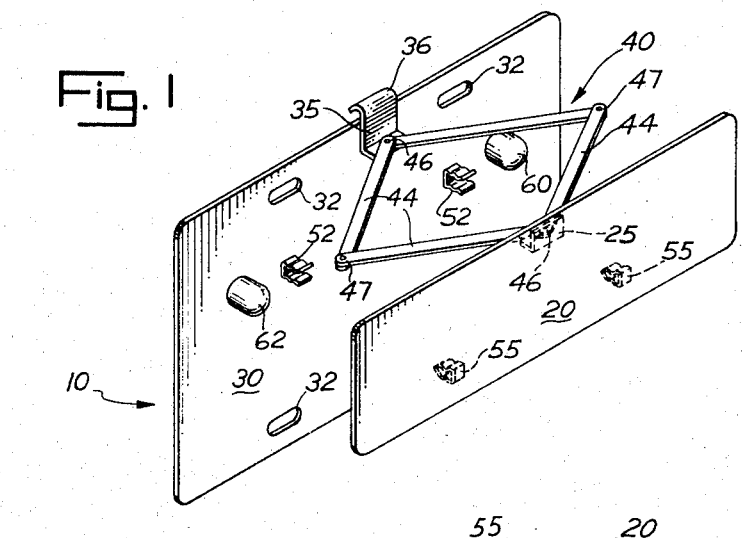
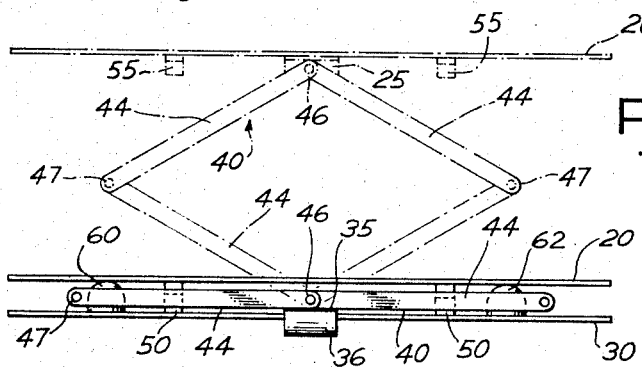
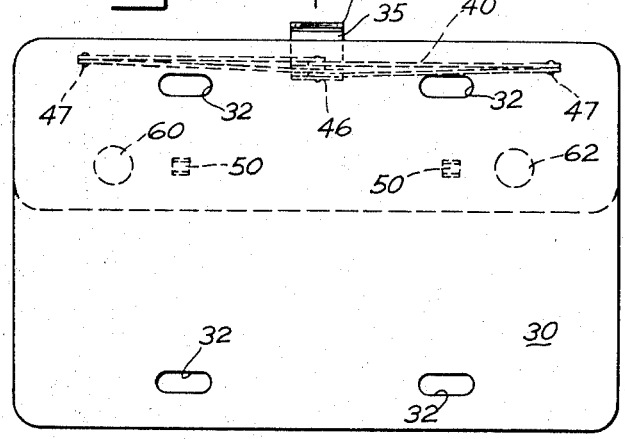
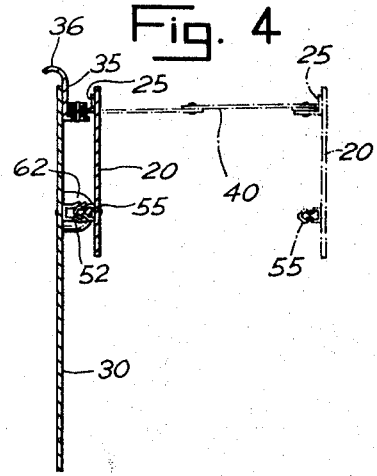
INVENTOR.
RICHARD W. KLEKAMP
BY
Horton, Davis, Brewer & Brugman
ATTORNEYS

United States Patent Office 3,439,440
Patented Apr. 22, 1969

3,439,440
EXTENSIBLE LICENSE PLATE HOLDER
Richard W. Klekamp, 1144 Monroe St.,
Springfield, Ill. 62704
Filed Sept. 26, 1966, Ser. No. 581,844
Int. Cl. G09f 7/20, 7/00, 7/10
U.S. Cl. 40—209     10 Claims

ABSTRACT OF THE DISCLOSURE

A license plate holder anchored to a vehicle by a lazy tongs and accessible by extension thereof. A friction catch secures the holder at a display disposition with the tongs collapsed. A resilient bumper between the anchor and license plate absorbs vibration and prevents rattling.

---

This invention relates generally to a license plate holder, and with more particularity, to an improved license plate holder which is extensible for accessibility thereto.

License plates are normally displayed at the front and back of vehicles, such as automobiles, trucks, motorcycles, etc. It has been common to provide holder brackets at positions flat against the bumpers or portions of the body, such as the grill or trunk. The license plates are then affixed by ordinary fasteners, to the brackets. A common failing of the prior art holder is their inaccessibility, making the removal and replacement of license plates inconvenient.

This invention envisions an improved license plate holder which displays the license plate at the usual inaccessible positions described above, however, which is extensible outward therefrom to facilitate removal and replacement of a license plate thereon.

Therefore, to overcome the foregoing and other difficulties of the prior art, the general object of this invention is to provide for quick and convenient removal and replacement of license plates.

One of the objects of this invention is to provide an extensible license plate holder which may be extended from its anchored display position against a motor vehicle, outward therefrom to an accessible position for removal and replacement of a license plate thereon.

Another object is the provision of a lazy tongs connection between a license plate holder and anchor therefor.

As an object of this invention, it is desired to eliminate rattling of a license plate and holder.

It is still another object to provide an extensible license plate holder of durable and rugged construction, which is economical to produce by uitlizing conventional, currently available materials that lend themselves to the standard mass-production manufacturing techniques.

Further and other objects, and a more complete understanding of the invention, may be had by referring to the following description and claims, taken in conjunction with the accompanying drawings in which:

FIG. 1 is a rear perspective view of the novel license plate holder herein.

FIG. 2 is a plan view of the license plate holder shown in FIG. 1.

FIG. 3 is a front elevational view of the license plate holder shown in FIG. 2.

FIG. 4 is a side elevational view of FIG. 2.

For the purpose of illustrating the invention, there is shown in the drawing a form which is presently preferred, it being understood, however, that this invention is not limited to the precise arrangements and instrumentalities there shown.

Referring now to the drawings in detail, wherein like numerals indicate like elements, there is shown in FIG. 1 an illustration of the extensible license plate holder of the present invention designated generally at 10. An anchor means is provided by an elongated plate 20 and the right angle bracket 25 projecting therefrom. The bracket 25 is riveted or spot-welded on plate 20, however, it could just as well be an integral tab punched and bent outward therefrom. The anchor means is affixed to the bumped or body of a vehicle (not shown) for example, by machine screws, bolts and nuts, tack welding, etc. The anchor plate 20 and anchor bracket 25 are preferably a suitable stiff gauge of metal sheeting.

Holder means are identified on the drawing as the rectangular flat holder plate 30. Slotted openings 32 are provided for reception of common bolts and nuts, for the purpose of attaching a license plate thereon in the usual manner. It is noted that the holder plate 30 is approximately the same size and shape of a license plate. Utilization of a stiff metal sheeting affords a reinforcement backing for the license plate. The holder means also includes a right angled bracket 35 which is affixed at the back of holder plate 30 by rivets, or other suitable fasteners. Again, the right angle holder bracket 35 could just as well be an integral tab punched and bent inward. The bracket 35 is preferably at the vertical centerline of the holder plate 30, as illustrated. Although the bracket 35 is shown connected at the top edge of the plate 30, it is understood that the bracket 35 may also be positioned near the bottom edge, or anywhere therebetween, as desired. It is noted that the bracket 35, if positioned near either the top or lower edge of the plate 30, may include an extension portion 36 which extends forward of the plate 30 to act as a guide and clamp or support shelf. The extension portion 36, if desired, could also be an integral tab portion extending from either the top or bottom edge of holder plate 30.

Extensible means connecting the anchor plate 20 to the holder plate 30, are provided by the lazy tongs shown generally at 40. The lazy tongs 40 includes four separate legs 44, each pivoted to one another at ends thereof, as shown, to form four articulated joints 46, 47. The diagonally opposite corners 46 are pivotally connected to the right angle bracket 25, 35 of the anchor plate 20 and holder plate 30, respectively. Extension and contraction of the lazy tongs 40 is in a direction substantially perpendicular to holder plate 30, as may be visualized best by reference to FIG. 1 and the dashed line representations of FIGS. 2 and 4. Nevertheless, at an extended position, the lazy tongs 40 may be pivoted to various non-perpendicular positions with respect to either the anchor plate 20 and/or the holder plate 30. This insures complete accessibility of the holder plate 30.

The license plate is normally displayed at a contracted disposition of the lazy tongs 40, that is, with the holder plate 30 adjacent and overlying the anchor plate 20. In the display position, the lazy tongs 40 are, of course, collapsed to their minimum length. The catch means 50 illustrated, is only one of many available magnetic or mechanical catches. In the example shown, a well known mechanical catch is provided by a detent 52 and an appropriately shaped prong member 55. The detent 52 has a constricted shape and resilient quality, enabling it to spread slightly upon entry of the prong 55, and then close tightly about indentations in the prong, to hold both firmly together. In this manner, the holder plate 30 is locked at the normal display disposition. As illustrated, two or more catch means 50 may be provided at symmetric positions with respect to the holder plate 30. However, a single catch 50 at the centerline of the holder plate 30, has been found to be satisfactory.

Resilient means are provided by the bumpers 60, 62 to absorb vibration and prevent rattling between the license plate holder and anchor plate 20. Two bumper members 60, 62, symmetrically spaced at the back of the holder plate 30 have been found to be satisfactory; however, it being understood that additional bumpers may be provided, if desired. The bumpers 60, 62 are fixed at positions between the anchor and holder plates 20, 30, by adhering the bumpers to one or the other of the plates 20, 30.

The elongated anchor plate 20 provides a backing to carry one part of the catch means 50 and to engage or carry the resilient bumpers 60, 62. However, it is understood, of course, that an anchor means 50 may be provided by the right angle anchor bracket 25 alone. In such case, the catch means 40 would have to be a single detent 52 and prong 55, one of which is affixed on the bracket 25. The bumper members 60, 62 would then engage against a portion of the bumper or vehicle body.

For removal and replacement of the license plate, the holder plate 30 is placed at an accessible position by merely pulling outward. This disengages catches 50 and extends the lazy tongs 40 to maximum length. If necessary, the holder plate 30 may be pivoted with respect to the anchor plate 20 by pivoting at either of the joints 46. In this manner complete accessibility is afforded for a quick and convenient license plate removal and replacement. The new license plate and holder plate 30 may then be placed at the normal display position by pushing inward toward the anchor plate 20. This collapses the lazy tongs 40 and engages the catches 50. The resilient members 60, 62 prevent any rattling therebetween and maintain a pressure on the catches to prevent accidental disengagement.

The present invention may be embodied in other specific forms without departing from the spirit of conventional attributes thereof and, accordingly, reference should be made to the appended claims, rather than to the foregoing specification as indicating the scope of the invention.

I claim:
1. An extensible license palte holder, comprising in combination: anchor means for affixture to a vehicle; holder means for attachment of a license plate thereon; and lineally extensible parallel linkage means for connection of said holder means to said anchor means, said extensible means, by contraction thereof, having a normal display disposition with said holder means adjacent and over-lying said anchor means, and also, by straight linear lengthening thereof, providing an accessible disposition with said holder means completely separated apart from said anchor means to facilitate removal and replacement of a license plate thereon.

2. A license plate holder in accordance with claim 1, including friction catch means for securement of said holder means adjacent to said anchor means at said display disposition.

3. A license plate holder in accordance with claim 2, including a resilient bumper between said anchor and holder means to absorb vibration and prevent rattling therebetween.

4. A license plate holder in accordance with claim 1, wherein said holder means includes a flat plate approximating the configuration of a license plate to afford a reinforcement backing therefor.

5. A license plate holder in accordance with claim 4, wherein said contraction and lengthening of said extensible means is in a direction substantially perpendicular to said flat plate.

6. A license plate holder in accordance with claim 5, wherein said extensible means are lazy tongs.

7. A license plate holder in accordance with claim 6, wherein said lazy tongs have four adjoining legs, pivoted one to another at the ends thereof to form four separate joints of said lazy tongs.

8. A license plate holder in accordance with claim 7, wherein one of said joints includes a pivotal connection with said flat plate which pivots thereabout with respect to said lazy tongs when extended for added accessibility thereof.

9. A license plate holder in accordance with claim 7, wherein diagonally opposite joints include pivotal connections with said flat plate and anchor means, respectively, enabling said lazy tongs, when extended, to pivot with respect to both, thereby increasing accessibility of said holder means.

10. A license plate holder in accordance with claim 9, wherein said pivotal connections are to right-angled brackets included in said anchor and holder means, respectively.

References Cited

UNITED STATES PATENTS

| | | | |
|---|---|---|---|
| 1,248,043 | 11/1917 | Ware | 40—209 |
| 1,250,543 | 12/1917 | Bartolomeo | 40—211 X |
| 1,259,555 | 3/1918 | Reilly | 40—211 |
| 1,887,087 | 11/1932 | Frizner | 40—209 |
| 2,155,300 | 4/1939 | Bybee | 40—125 |

EUGENE R. CAPOZIO, *Primary Examiner.*

W. J. CONTRERAS, *Assistant Examiner.*

U.S. Cl. X.R.

40—125